— United States Patent Office — 3,079,366 — Patented Feb. 26, 1963 —

3,079,366
SUBSTITUTED ARYLAMINOETHYLENES AS
ULTRAVIOLET ABSORBERS
Richard J. Boyle, Neshanic, Peter V. Susi, Middlesex, and Jerry P. Milionis, Bound Brook, N.J., assignors to American Cyanamid Company, New York, N.Y., a corporation of Maine
No Drawing. Filed June 26, 1961, Ser. No. 119,298
13 Claims. (Cl. 260—45.9)

This invention relates to a new class of ultraviolet absorbing compounds and more particularly to substituted arylaminoethylene ultraviolet absorbers represented by the formula:

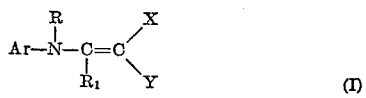

(I)

wherein Ar is a carbocyclic aromatic radical of less than three 6-membered rings which may be substituted by hydroxy, alkyl, i.e., alkyl radicals of less than eighteen carbons, alkoxy, halogen (especially those having an atomic weight between 34 and 81) carboxy, carbalkoxy, nitro, amino, monalkylamino and dialkylamino (especially alkyl of less than eighteen carbons) sulfo (or alkali metal salts) and/or sulfonamido radicals; R is hydrogen, alkyl of less than eighteen carbon atoms, cyanoalkyl (especially wherein the alkyl group is of less than four carbon atoms, e.g. cyanoethyl), aryl (especially monocyclic aryl, e.g. the phenyl radical which may bear any of the substituents suitable for Ar); and aralkyl radicals (especially monocyclic and lower alkyl e.g. benzyl and phenethyl) $R_1$ is hydrogen, lower alkyl, aryl radicals (especially monocyclic aryl radicals which may bear any of the substituents suitable for Ar) and aralkyl radicals (especially monocyclic lower alkyl radicals, e.g. benzyl and phenethyl); and X and Y are each cyano, carbalkoxy, alkanoyl (especially lower alkanoyl, e.g. acetyl), aroyl (especially monocyclic aroyl which may bear any of the substituents suitable for Ar, e.g., benzoyl), carboxamido or mono- or di-lower alkyl carboxamido. A preferred class of compounds within the scope of Formula I is the alkyl esters of β-(N-methylanilino)-α-cyanoacrylate. Another class of compounds within the scope of Formula I of particular value in the stabilization of polyolefins is the β-(N-alkylanilino)-α-cyanoacrylonitrile.

Various types of compounds have been used as ultraviolet absorbers for the protection of organic materials, especially polymeric plastic compositions, against the deteriorative action of ultraviolet light. To be effective for such purposes, the compound used should have certain characteristics such as the ability to absorb strongly in the ultraviolet range, high stability to light of various wave lengths both visual and ultraviolet, little or no absorption in the visible range (above 400 millimicrons), low volatility, and compatibility with, and solubility in, various types of organic carriers, etc. Although many of the compounds used, meet the necessary requirements in some respects, for some uses and in certain organic substrates, few compounds can simultaneously fulfill all requirements. Many of the compounds, also, are deficient and unsatisfactory for some purposes. Thus, especially with the development of new polymers, and with the development of new polymeric plastic products, there is a continued need for new ultraviolet absorbing materials which may be applied as ultraviolet absorbers to meet the requirements in various kinds of plastics.

The present invention is based on the discovery of a new class of ultraviolet absorbing materials as defined above. These compounds show useful ultraviolet absorbing properties in a wide variety of organic substrates, particularly polymeric plastic compositions, generally with good ultraviolet light absorbing properties with superior light stability and lack of visible color (little or no absorption in the visible range).

The compounds of the invention may be used in organic carriers for stabilization of the carrier per se against the effects of ultraviolet light, especially in polymeric compositions such as polystyrene, polyesters, polyolefins (polyethylene, polypropylene, polybutylene and mixtures thereof) polyvinyl chloride, polyvinyl acetate, poly(vinyl chloride-acetate) poly(vinylchloride-vinylidine chloride) polyvinyl fluoride, poly(vinyl fluoride-acetate), polyacrylates, cellulosics (cellulose acetate, cellulose acetate-butylate, nitrocellulose), polycarbonate, polyoxymethylene, polyamides, alkyds (long-oil modified; styrenated), polyurethanes, polyureas, polyvinyl butyral, styrene-acrylonitrile, styrene-butadiene, styrene-butadiene-acrylonitrile, acrylonitrile-vinyl acetate, phenol-formaldehyde, urea-formaldehyde, and melamine-formaldehyde. The stabilized carriers may be used as screening for the protection of other ultraviolet light-sensitive materials.

They are especially useful in polystyrene and in superpolyamides such as nylon and in polyolefins such as polyethylene and polypropylene. Generally they are used in concentrations of from about 0.05 to 10.0% with a concentration of about 0.2 to 1.0% being preferred for practical results from the economic and functional standpoints.

They may be incorporated into the polymeric formulations by the usual methods known in the art for this purpose.

The compounds represented by Formula I are conveniently prepared by conventional methods which may be described briefly as follows:

1. Reaction of an organic amine (such as aniline) with a lower alkyl orthocarboxylate (e.g. orthoformate, orthoacetate and orthobenzoate) and an appropriately substituted active methylene group compound such as a malonic acid derivative with or without a solvent, which reaction may be exemplified by the following Equation 1:

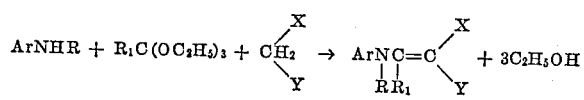

(2) Reaction of an aromatic amine such as aniline with the appropriately substituted alkoxyalkylene-malono derivative with or without a solvent which reaction may be exemplified by the following Equation 2:

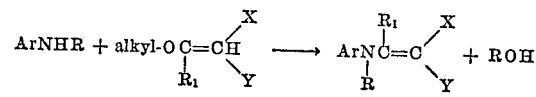

wherein Ar, R, $R_1$, X and Y are as hereinbefore defined.

Examples of the aromatic amines which may be used in these preparations are:

Aniline
p-Anisidine
p-Chloroaniline
p-Butoxyaniline
p-Octadecyloxyaniline
o-Toluidine
2,4-dimethylaniline
2,4-dichloroaniline
m-Toluidine
p-Butylaniline
p-Dodecylaniline
N-methylaniline
N-cyanoethylaniline
N-octylaniline
N-butyl-p-anisidine
1-naphthylamine
Octyl p-aminobenzoate
m-Fluoroaniline
p-Bromoaniline
p-Aminobenzoic
p-Aminobenzenesulfonic acid
o-Aminophenol
p-Aminophenol
N-propyl-p-aminophenol
2,4-dimethoxyaniline
4-aminosalicylic acid
N-methyl-p-anisidine Examples of the active methylene group-containing-compounds which may be used in the reaction of Equation 1 are:

Malononitrile
Ethyl cyanoacetate
Cyanoacetamide
Ethyl acetoacetate
2,4-pentandione
Methyl benzoylacetate
Octyl cyanoacetate
Diethyl malonate
N-octyl cyanoacetamide
Dibenzoylmethane
Benzoylacetonitrile Examples of the alkoxy alkylenemalono derivatives which may be used according to the reaction represented in Equation 2 are those products derived from the reaction of trialkyl orthocarboxylate with the active methylene group containing compounds listed above.

A useful method for the evaluation of the compounds of the invention as ultraviolet absorbers involves determination of the maximum absorption in the ultraviolet range, determination of the absorbancy index of the compound at the maximum absorption which is an index of the degree of absorption of the compounds and the extinction coefficient (epsilon) at the wave length of maximum absorption.

In addition since the stability to the action of light is highly important for use of ultraviolet absorbing materials for practical purposes, determination of light stability is a useful method for evaluating compounds. This may be done by exposing the compound in solution to ultraviolet light and then measuring the amount remaining as the original compound after the exposure.

The invention is further illustrated by the following examples.

EXAMPLE 1.—α-CYANO-β-(p-METHOXYANILINO)ACRYLONITRILE

To 250 ml. of ethanol was added 24.6 g. of p-methoxyaniline, 29.6 g. of triethyl orthoformate, and 13.2 g. of malononitrile to form a solution which was heated at the reflux temperature for three hours. After cooling, the solid material which separated was isolated by filtration, flushed with ethanol and recrystallized from a mixture of acetone and ethanol giving 28.5 g. of product with a melting point of 254 to 255° C.

EXAMPLE 2.—ETHYL α-CYANO-β-(N-METHYLANILINO)ACRYLATE

A mixture of 214 g. of N-methylaniline, 296 g. of triethyl orthoformate, and 226 g. of ethyl cyanoacetate was stirred and heated at the reflux temperature until the temperature of the reaction mixture reached 165° C. The apparatus in which this was carried out was fitted for distillation after reaching 165° C., then mixture was heated at this temperature for an additional period (about a half hour). (During this total period, approximately 320 ml. of distillate resulted.)

The reaction mixture was then diluted with 500 ml. of ethanol and after clarifying hot with activated charcoal, the solution was cooled; the solid material which separated was isolated by filtration, washed with diethyl ether and dried. The product weighed 224 g. (49% yield) and after purification from alcohol melted at 101 to 102° C.

When 0.50% of ethyl α-cyano-beta-(N-methylanilino)-acrylate in polyoxymethylene was milled on a heated two roll mill and then pressed into film, the resulting film showed better light stability than the control without an added U.V. absorber.

EXAMPLE 3.—ETHYL α-CARBETHOXY-β-ANILINOACRYLATE

A mixture of 4.7 g. of aniline and 10.8 g. of diethyl ethoxymethylenemalonate is heated on the steam bath for several hours. After cooling, a solid material crystallized out and the crude solid material was removed by filtration and recrystallized from petroleum ether, giving a product having a melting point of 50 to 51° C.

EXAMPLE 4

A variety of compounds was prepared using the methods described in Examples 1, 2 and 3.

Thus, several series of derivatives were prepared falling within the scope of compounds as defined above derived from malononitrile, diethylmalonate, ethyl cyanoacetate and benzoylacetonitrile, ethyl acetoacetate, etc. with variously substituted aromatic amines of the benzene and naphthalene series.

The compounds prepared are listed in the tables shown below.

The compounds were evaluated as ultraviolet absorbers in a number of ways. Thus, the wave length of maximum absorption in the ultraviolet range was determined; the absorbancy index, which is a measure or index of the degree of absorption, was determined usually at the wave length of maximum absorption; and the extinction coefficient at the wave length of maximum absorption was also determined. The method used and the results are shown below in the tables.

*Absorbancy Index*

For evaluation of compounds as ultraviolet absorbers, the wave length of maximum absorption in solvents such as butyl acetate and toluene which are reasonable prototypes of oxygenated polymers and hydrocarbon polymers was determined. The position of the maximum wave length of absorption is an important factor in determining whether a compound is suitable as an ultraviolet absorber. In addition, the strength or degree of absorption, especially at the wave length of maximum absorption, is also useful in determining the efficiency of an ultraviolet absorber. A useful means for expressing the strength or degree of absorption is as the absorbancy index (absorption coefficient).

For such measurements ultraviolet absorption curves are determined spectrophotometrically in an ultraviolet spectrophotometer on the compound in solution. The absorbancy index at the wave length of maximum absorption desingated as $a_{max}$ is an expression of the degree of absorption at the wave length of maximum absorption and is calculated using the following relationship:

$$a = -\frac{1}{bc} \log \frac{T}{T_0}$$

where $a$ is the absorption coefficient
$b$ is the thickness of the spectrophotometer cell in centimeters
$c$ is the concentration in grams per liter
$T$ is the amount of light passing through solution $T_0$ is the amount of light passing through the solvent only in the same cell

TABLE I

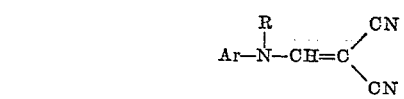

| $\underset{Ar-N-}{R}$ | $\lambda_{max}(m\mu)$ | $a_{max}$ | $\Sigma_{max}$ |
|---|---|---|---|
| ⟨phenyl⟩-NH- | 317 | 129 | 21,900 |
| CH₃O-⟨phenyl⟩-NH- | 327 | 91 | 18,200 |
| Cl-⟨phenyl⟩-NH- | 325 | 135 | 26,400 |
| HO-⟨phenyl⟩-NH- | 330 | 99 | 18,300 |
| C₄H₉-⟨phenyl⟩-NH- | 323 | 95 | 21,300 |
| C₁₂H₂₅-⟨phenyl⟩-NH- | 322 | 69 | 23,400 |
| C₂H₅OOC-⟨phenyl⟩-NH- | 333 | 138 | 33,200 |
| Cl,Cl-⟨phenyl⟩-NH- | 325 | 95 | 22,600 |
| OH-⟨phenyl⟩-NH- | 335 | 105 | 19,400 |
| ⟨naphthyl⟩-NH- | 325 | 87 | 19,100 |
| HOOC-⟨phenyl⟩-NH- | 328 | 30 | 6,500 |
| NaSO₃-⟨phenyl⟩-NH- | 318 | 73 | 19,900 |
| ⟨naphthyl⟩-NH- | 328 | 115 | 25,400 |
| C₈H₁₇OOC-⟨phenyl⟩-NH- | 330 | 107 | 34,800 |
| C₈H₁₇O-⟨phenyl⟩-NH- | 330 | 66 | 19,700 |
| NH₂SO₂-⟨phenyl⟩-NH- | 325 | 20 | 5,100 |
| ⟨phenyl⟩-N(CH₃)- | 302 | 112 | 20,500 |
| O₂N-⟨phenyl⟩-NH- | 352 | 150 | 32,000 |
| (CH₃)₂N-⟨phenyl⟩-NH- | 355 | 58 | 18,000 |
| CH₃O-⟨phenyl⟩-N(CH₃)- | 300 | 91 | 19,400 |

TABLE II

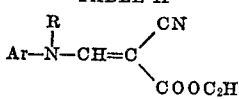

| $\underset{Ar-N-}{R}$ | $\lambda_{max}(m\mu)$ | $a_{max}$ | $\Sigma_{max}$ |
|---|---|---|---|
| ⟨phenyl⟩-NH- | 325 | 118 | 25,500 |
| ⟨phenyl⟩-N(phenyl)- | 320 | 77 | 22,400 |
| CH₃O-⟨phenyl⟩-NH- | 335 | 87 | 21,400 |
| CH₃O-⟨phenyl⟩-N(CH₃)- | 303 | 88 | 22,800 |
| ⟨phenyl⟩-N(CH₃)- | 308 | 105 | 24,100 |
| ⟨phenyl⟩-N(C₄H₉)- | 305 | 61 | 16,500 |

TABLE III

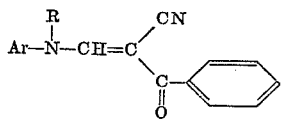

| $\underset{Ar-N-}{R}$ | $\lambda_{max}(m\mu)$ | $a_{max}$ | $\Sigma_{max}$ |
|---|---|---|---|
| ⟨phenyl⟩-NH- | 363 | 100 | 24,800 |
| ⟨phenyl⟩-N(CH₃)- | 335 | 79 | 20,700 |

TABLE IV

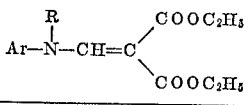

| $\underset{Ar-N-}{R}$ | $\lambda_{max}(m\mu)$ | $a_{max}$ | $\Sigma_{max}$ |
|---|---|---|---|
| ⟨phenyl⟩-NH- | 322 | 104 | 27,300 |
| CH₃O-⟨phenyl⟩-NH- | 330 | 77 | 22,700 |
| ⟨phenyl⟩-N(CH₃)- | 302 | 82 | 22,600 |
| CH₃O-⟨phenyl⟩-N(CH₃)- | 300 | 74 | 22,700 |

TABLE V

| Miscellaneous | $\lambda_{max}$ (m$\mu$) | $a_{max}$ | $\Sigma_{max}$ |
|---|---|---|---|
| Cl-C₆H₄-NH-CH=C(COCH₃)(COOC₂H₅) | 338 | 91 | 24,200 |
| C₆H₅-N(CH₃)-CH=C(CN)(COOCH₃) | 305 | 118 | 25,500 |
| C₆H₅-N(CH₃)-CH=C(CN)(COOC₈H₁₇) | 305 | 81 | 25,300 |
| C₆H₅-NH-C(CH₃)=C(CN)(CN) | 292 | 99 | 18,100 |
| C₆H₅-NH-C(CH₃)=C(COOC₂H₅)(CN) | 302 | 91 | 21,000 |
| CH₃O-C₆H₄-NH-C(CH₃)=C(CN)(CN) | 290 | 82 | 17,400 |
| CH₃O-C₆H₄-NH-C(CH₃)=C(COOC₂H₅)(CN) | 300 | 81 | 21,100 |

EXAMPLE 5

Films of polyethylene containing 0.1% and 0.5% of α-cyano-β-(4-dodecylanilino)acrylonitrile were prepared and the percent carbonyl formation on exposure to outdoor weathering (including sunlight with ultraviolet) was determined, in addition to percent elongation.

The carbonyl group concentration after exposure is a direct index of the oxidative deterioration which has taken place in the polyethylene under exposure to ultraviolet light in daylight. A low relative concentration of carbonyl in polyethylene containing the ultraviolet absorber after exposure shows protection against the effects of ultraviolet light. The elongation test as percent is a measure of how much the composition may be stretched before rupturing and shows the effects of deteriorative action by exposure to ultraviolet light.

The procedure used is described as follows. The ultraviolet absorber to be tested (either 0.1% or 0.5% concentration based on the polyethylene) and 100 g. of polyethylene (DYNH from Bakelite) are milled together for 40 passes (about 5 minutes) on a two roll mill which has only the rear roll heated (about 330° F.). The milled samples are next hot pressed between polished plates at about 325° F. into sheets of about 0.010 to 0.015 in. thickness (about 10 to 15 mils). Small pieces of these sheets are then used for the test. For determination of carbonyl content, small pieces of the sheets are mounted into holders and exposed outdoors at a 45° angle to the horizontal and facing south. After exposure the infra red spectra are determined for each sample in the range of 5 to 7 microns on an infra red spectrophotometer, the absorption at 5.8 microns being measured. The results may be expressed in percent carbonyl.

Percent elongation measurements of exposed and non-exposed samples are taken on an Instron Testing Machine. The percent elongation which takes place on stretching before the sample ruptures is determined. The results are expressed as follows:

| Concentration | Percent carbonyl | Percent elongation |
|---|---|---|
| Control (no additive, not exposed) | | 726 |
| Control (additive, not exposed) | | 8.8 |
| Control (no additive, exposed) | 0.31 | 38 |
| 0.1% compound | 0.23 | 105 |
| 0.5% compound | 0.06 | 568 |

EXAMPLE 6

α-Cyano-β-anilino-acrylonitrile was applied to nylon taffeta fabric by an exhaustion method at 5% concentration on the weight of the fabric. The exhaustion was carried out using a 30:1 liquor to cloth ratio. The bath was prepared with water only and the fabric entered. The temperature was raised slowly to the boiling point with constant stirring and the ultraviolet absorbing material in ethanol solution was then gradually added. When the addition of the ultraviolet absorber was complete, the exhaustion application was continued for another 60-minute period at the boiling point with continuous stirring. The fabric was then removed, rinsed thoroughly and dried. The tensile strength loss in the fabric was then determined after exposure of the fabric for 80 hours in a Fade-Ometer and a Weather-Ometer (no water spray in the Weather-Ometer). The results were as follows:

| | Tensile strength loss (percent) | |
|---|---|---|
| | Weather-Ometer exposure | Fade-Ometer exposure |
| Untreated fabric | 83 | 85 |
| Treated fabric | 51 | 67 |

Nylon taffeta fabric is protected against ultraviolet degradation by use of ethyl α-cyano-beta-(N-phenylanilino)-acrylate in a manner described in Example 6. Also useful in this application are ethyl α-cyano-beta-anilinocinnamate and N-ethyl α-cyano-beta-anilinoacrylamide.

EXAMPLE 7

To 100 grams of polystyrene, 0.25 gram of ethyl α-cyano-β-(N-methylanilino)-acrylate were added on a hot two roll mill. One roll was maintained at 350° F. and the other at 250° F. The mix was blended continuously over a ten minute period by repeatedly passing the mix through the nip of the rolls for 70 passes. A small sample of this mix was then compression molded into a .050" x 2" x 2" chip. A yellow index reading was taken before and after each designated exposure period in the Fade-Ometer. The yellow index readings were determined according to ASTM D791-54.

| Polystyrene, grams | Ethyl α-cyano-β-(N-methylanilino)acrylate, grams | Yellow index after "x" hrs. in Fade-Ometer | | | | |
|---|---|---|---|---|---|---|
| | | 0 hr. | 200 hr. | 400 hr. | 500 hr. | 700 hr. |
| 100 | 0 | 5.9 | 11.8 | 23.8 | 32.6 | 43.6 |
| 100 | 0.25 | 7.1 | 8.1 | 10.2 | 12.9 | 17.4 |

Good protection against U.V. degradation is achieved when ethyl α-cyano-beta-(N-cyanoethylanilino)-acrylate is used in place of ethyl α-cyano-beta-(N-methylanilino)-acrylate in Example 7.

EXAMPLE 8

The following formulation was compounded for five minutes in a heated two roll mill with the front roll at 350° F. and the rear roll at 250° F.

| | Parts |
|---|---|
| Polyvinylchloride (Bakelite VYNS) | 85 |
| Polyvinylchloride (Bakelite VYHH) | 15 |
| Cadmium-barium soap (Argus, Mark 99) | 3 |
| Stearic acid | 0.5 |
| U.V. absorber [1] | 0.2 |

[1] Ethyl $\alpha$-cyano-$\beta$-(N-methylanilino)acrylate.

From this stock a 21 mil thick film was compression molded at 350° F. This film was then exposed in the Fade-Ometer and Weather-Ometer for the indicated periods.

| | Yellow index | | |
|---|---|---|---|
| | Unexposed | WOM (100 hrs.) | FOM (200 hrs.) |
| Control | 6 | 33 | 17 |
| Ethyl $\alpha$-cyano-$\beta$-methylanilino-acrylate | 6 | 6 | 10 |

The yellow index is determined on a differential colorimeter using the following formula:

$$\text{Yellow index} = 70\left(100 - \frac{\text{Blue}}{\text{Green}}\right)$$

EXAMPLE 9

Into polypropylene was milled the following two U.V. absorbers. The U.V. absorber was dry blended with the powdery polypropylene for three hours. This mix was then fluxed for five minutes on a heated two roll mill with the front roll at 350° F. and the rear roll at 320° F. After this a 12 mil film was compression molded from this stock. This film was exposed in the Fade-Ometer and the exposure time at which the film became brittle was noted.

| | Brittle point (hrs.) FOM |
|---|---|
| Control | 30 |
| Ethyl $\alpha$-cyano-beta-(N-methylanilino) acylate (0.25%) | 70 |
| $\alpha$-Cyano-beta-(p-dodecylanilino)acrylonitrile (0.25%) | 100 |

EXAMPLE 10

Into 4.5 parts of monomeric styrene were stirred 0.5 part of benzoyl peroxide and 0.25 part of $\alpha$-cyano-beta-anilinoacrylonitrile. This solution was then added to 95 parts of a polyester resin (i.e., Cyanamid Laminac Polyester Resin 4123). This total solution was poured into a 1/8" thick mold (two glass plates with gasket for 1/8" spacing). The mold was placed in an 80° C. oven for 30 minutes. The cured sheet was then exposed to an RS sunlamp at 8" lamp to sample distance.

| | Yellow index [1] | | | | |
|---|---|---|---|---|---|
| | 0 hrs. | 15 hrs. | 19 hrs. | 37 hrs. | 106 hrs. |
| Control | 4 | 21 | 24 | 24 | |
| .25% $\alpha$-cyano-beta-anilino-acrylonitrile | 4 | 7 | 8 | 13 | 18 |

[1] The formula used to calculate yellow index is as follows.

$$\text{Yellow index} = \frac{\text{Percent } R_{550m\mu} - \text{Percent } R_{430m\mu}}{1.57 \times \text{Percent } R_{550m\mu}} \times 100$$

R=reflectance.

We claim:

1. A composition of matter resistant to the deteriorative effects of ultraviolet light comprising a polymeric material and from about 0.05% to about 10% by weight of a compound represented by the formula

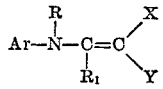

wherein Ar is an aryl radical; R is a member selected from the group consisting of hydrogen, alkyl, cyanoalkyl and aryl; $R_1$ is a member selected from the group consisting of hydrogen, lower alkyl, aryl and aralkyl; and X and Y are each selected from the group consisting of cyano, carbalkoxy, alkanoyl, aroyl, carboxamido and lower alkyl carboxamido each of said aryl radicals having less than three 6-membered carbocyclic rings, bearing substituents selected from the group consisting of hydrogen, hydroxy, alkyl, alkoxy, nitro, halogen, carboxy, amino, alkylamino, carbalkoxy, sulfo and sulfonamido radicals.

2. The composition of claim 1 wherein the polymeric material is a polystyrene.

3. The composition of claim 1 wherein the polymeric material is a polyoxymethylene.

4. The composition of claim 1 wherein the polymeric material is a vinylchloride polymer.

5. The composition of claim 1 wherein the polymeric material is a polyolefin.

6. The composition of claim 1 wherein the compound is an alkyl $\beta$-(N-methylanilino)-$\alpha$-cyanoacrylate.

7. The composition of claim 6 wherein the polymer is a polystyrene.

8. The composition of claim 6 wherein the polymer is a polyoxymethylene.

9. The composition of claim 6 wherein the polymer is a polyolefin.

10. The composition of claim 1 wherein the compound is an ethyl $\beta$-(N-methylanilino)-$\alpha$-cyanoacrylate.

11. The composition of claim 10 wherein the polymer is a polystyrene.

12. The composition of claim 1 wherein the compound is $\beta$(N-alkylanilino)-$\alpha$-cyanoacrylonitrile.

13. The composition of claim 12 wherein the polymeric material is a polyolefin.

No references cited.

UNITED STATES PATENT OFFICE
CERTIFICATE OF CORRECTION

Patent No. 3,079,366                       February 26, 1963

Richard J. Boyle et al.

It is hereby certified that error appears in the above numbered patent requiring correction and that the said Letters Patent should read as corrected below.

Column 2, line 37, for "incomporated" read -- incorporated --; line 43, for "1." read -- (1) --; column 4, line 60, for "desingated" read -- designated --; column 5, lines 71 to 74, the formula should appear as shown below instead of as in the patent:

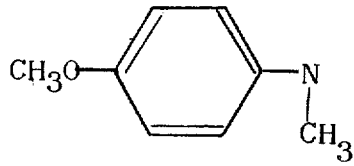

column 8, line 8, in the table, under the heading "Percent elongation" second line thereof, for "8 8" read -- 818 --; column 9, lines 31 to 35, the formula should appear as shown below instead of as in the patent:

$$\text{Yellow index} = 70 \left(1 - \frac{\text{Blue}}{\text{Green}}\right)$$

Signed and sealed this 1st day of December 1964.

(SEAL)
Attest:

ERNEST W. SWIDER
Attesting Officer

EDWARD J. BRENNER
                                                Commissioner of Patents